United States Patent
Dees

(10) Patent No.: US 10,898,024 B2
(45) Date of Patent: Jan. 26, 2021

(54) ASSEMBLY AND METHOD FOR FROTHING FLUID

(71) Applicant: Koninklijke Douwe Egberts B.V., Utrecht (NL)

(72) Inventor: Hendrik Johan Dees, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 216 days.

(21) Appl. No.: 16/122,760

(22) Filed: Sep. 5, 2018

(65) Prior Publication Data

US 2019/0059638 A1  Feb. 28, 2019

Related U.S. Application Data

(63) Continuation of application No. PCT/NL2017/050147, filed on Mar. 9, 2017.

(30) Foreign Application Priority Data

Mar. 9, 2016 (NL) ...................................... 2016402

(51) Int. Cl.
*A47J 31/40* (2006.01)
*A47J 43/12* (2006.01)
(Continued)

(52) U.S. Cl.
CPC ......... *A47J 31/4485* (2013.01); *A47J 31/461* (2018.08); *A47J 31/468* (2018.08); *A47J 31/469* (2018.08); *A47J 31/56* (2013.01)

(58) Field of Classification Search
CPC .. A47J 31/40–41; A47J 31/44; A47J 31/4485; A47J 31/4489; A47J 31/4496; A47J 43/12–122
See application file for complete search history.

(56) References Cited

U.S. PATENT DOCUMENTS

2009/0011110 A1* 1/2009 Gotlenboth ......... A47J 31/4485
426/594
2011/0070349 A1 3/2011 Burri et al.
(Continued)

FOREIGN PATENT DOCUMENTS

CN 204483851 7/2015
CN 204950593 1/2016
(Continued)

OTHER PUBLICATIONS

International Search Report and Written Opinion, PCT/NL2017/050147, Koninklijke Douwe Egberts B.V., 8 pages (Jun. 30, 2017).
(Continued)

*Primary Examiner* — Michael A LaFlame, Jr.
(74) *Attorney, Agent, or Firm* — Fitch, Even, Tabin & Flannery LLP

(57) ABSTRACT

An assembly for frothing a fluid is disclosed. The assembly includes an air channel that includes an air inlet, a downstream end and a controllable air supply assembly. The assembly also comprises a fluid channel extending from a fluid inlet to a fluid outlet. The fluid channel subsequently includes a first temperature sensor that is positioned near the fluid inlet, an air inlet emanation point that is connected to the downstream end of the air channel, a frothing unit, a heater and an electronic controller assembly. The electronic controller assembly is configured for receiving the temperature input from the first temperature sensor and regulating the amount of air that is channeled to the fluid channel based on a temperature input received from the first temperature sensor. Also disclosed are a refrigerator including the assembly and a method for frothing the fluid.

23 Claims, 3 Drawing Sheets

(51) Int. Cl.
    *A47J 31/44*     (2006.01)
    *A47J 31/46*     (2006.01)
    *A47J 31/56*     (2006.01)

(56) References Cited

U.S. PATENT DOCUMENTS

| | | |
|---|---|---|
| 2011/0256289 A1 | 10/2011 | Steiner |
| 2013/0145936 A1 | 6/2013 | Dollner et al. |
| 2013/0209639 A1 | 8/2013 | Larson et al. |
| 2015/0150408 A1 | 6/2015 | Schlee |
| 2018/0084940 A1* | 3/2018 | White .................. G01K 1/14 |
| 2019/0365144 A1* | 12/2019 | Upston .................. A47J 31/44 |

FOREIGN PATENT DOCUMENTS

| | | |
|---|---|---|
| CN | 205018844 | 2/2016 |
| EP | 2 120 656 | 11/2009 |
| WO | WO-2017/155401 | 9/2017 |

OTHER PUBLICATIONS

Chinese office action dated Apr. 27, 2020 for Chinese Application No. 201780012724.X (3 pgs.).

Search Report dated Apr. 17, 2020 for Chinese Application No. 201780012724.X (2 pgs.).

* cited by examiner

ASSEMBLY AND METHOD FOR FROTHING FLUID

CROSS-REFERENCE TO RELATED APPLICATIONS

This application is a continuation of PCT/NL2017/050147, filed Mar. 9, 2017, which claims the benefit of and priority to Netherlands Application No. 2016402, filed Mar. 9, 2016, the entire contents of all of which are hereby incorporated herein by reference.

BACKGROUND

The invention relates to an assembly and a method for frothing a fluid

Devices for frothing liquids, such as milk or cream, are well known in the art, for example from US 20130145936 and EP 2.120.656 B1.

US2013/0145936 discloses in FIG. 4 a milk frothing apparatus including a cold milk container, a milk supply conduit including a milk pump. The milk is heated and frothed by mixing the milk in a frothing chamber with an air/steam mixture supplied by a steam generator that is fed with water and air. The air is supplied to the steam generator from a compressed air source via an air conduit that includes a valve. The system includes a temperature sensor that is positioned in the milk container as well as control device that can be connected to some or all elements of the frothing apparatus which are capable of being controlled and/or regulated. In the known apparatus, the milk is frothed and heated with a steam/air mixture.

EP 2.120.656 B1 discloses a device for the production of milk foam or milk-based drinks. The device comprises a container containing cold milk that is to be provided to the assembly for frothing, and a pump that may be brought in fluid connection with the container by a milk conduit so that cold milk can be drawn from the container to the pump. The device also comprises an air conduit with an air inlet and an air outlet, the latter of which emanates in the milk conduit. The device furthermore comprises a valve assembly that is configured to supply an amount of air to the fluid channel to form the fluid/air-mixture. The pump is connected to a restriction for frothing the milk/air-mixture that is supplied to the restriction by the pump. Downstream of the restriction a valve assembly is installed in the milk conduit. In a first state of the valve assembly, the frothed milk is delivered to and dispensed from the milk outlet conduit via a milk outlet. In the second state of the valve assembly, the frothed milk is led through a parallel milk conduit that includes a heater to heat the frothed milk before it is delivered and dispensed from the outlet.

SUMMARY

A disadvantage of the device known from the prior art is that the frothed milk does not have a consistent quality. The inventors have established that an important factor causing the inconsistent quality is the temperature of the milk product to be frothed. UHT milk having an ambient temperature leads to a different frothed end product than the same UHT milk that has been cooled in a refrigerator.

The invention is aimed at providing an assembly with which a relatively high and constant quality of frothed fluid can be dispensed. To that end, the assembly comprises:
an air supply assembly including an air source and an air channel having an air inlet and a downstream end, the air source being connected to the air inlet, wherein the air supply assembly is configured to control the flow of air that is supplied to the downstream end;
a fluid channel extending from a fluid inlet to an fluid outlet, the fluid channel including subsequently:
a first temperature sensor that is positioned adjacent or in the fluid inlet and that is configured to generate a first temperature signal that is associated with a sensed temperature of the fluid adjacent or in the fluid inlet;
an air inlet emanation point to which the downstream end of the air channel is connected;
a frothing unit including a pump;
a heater;
and wherein the assembly comprises:
an electronic controller assembly configured for:
receiving the first temperature signal, and
controlling the controllable air supply assembly in response to at least the first temperature signal for controlling the flow of air that is supplied to the fluid channel.

Fluid may, for example, various types of milk, almond milk, chocolate milk, goat milk, concentrated milk, soy milk etc. The advantage of the assembly according to the invention is that the ratio between fluid and air in the fluid/air-mixture is adapted to the temperature of the fluid that is provided at the fluid inlet. This is done by means of the electronic controller assembly that, based on the information provided by the temperature sensor, regulates the controllable air supply assembly and therewith the amount of air that is added to the fluid present in the fluid channel. The regulation of the amount of air that is supplied to the fluid may compensate temperature variations of the fluid that is supplied. Thus, a consistent quality of frothed fluid from the fluid outlet may be obtained. Dependent on the wish of the consumer, the milk foam may be wet, i.e. more milk per volume of foam or dry, i.e. less milk per volume of foam. Additionally, the temperature of the foam may be varied, for example, cold foam or hot foam. Further, the amount of foam that is dispensed may be varied. To that end, various recipes may be programmed in the electronic controller assembly.

The temperature of the fluid adjacent or in the fluid inlet may lie within a range of temperatures wherein range of temperatures extends from a relatively low temperature to a relatively high temperature. The flow of air that may be supplied may lie within a range of flows wherein the range of flows extends from a relatively small flow to a relatively high flow. Flow is defined as supplied volume per time and may, for example be expressed in ml/s. In an embodiment, the electronic controller assembly may be configured to control the controllable air supply assembly such that, when the temperature of the fluid is relatively low within the range of temperatures, the flow of air is controlled to be relatively low in the range of flows, and that, when the temperature of the fluid is relatively high within the range of temperatures, the flow of air is controlled to be relatively high in the range of flows. In other words, when, in use, the temperature sensor detects a relatively high temperature near or in the fluid inlet, the electronic controller assembly may increase the flow of air that is supplied to the fluid in the fluid channel is relatively high. Conversely, the flow of air may be reduced when the temperature of the fluid near or in the fluid inlet is relatively low in the range of temperatures, so that an amount of air that is supplied to the fluid in the fluid channel is relatively low in the range of that may be supplied to the fluid channel. The electronic controller assembly, based on the temperature detected by the temperature sensor, regulates the ratio between the fluid and air in the fluid/air-mixture so that a consistent and desired quality of frothed fluid may be produced by the assembly. This may, for example, be one of the desired foam varieties that have been described above, i.e.: hot dry foam, hot wet foam, cold dry foam, or cold wet foam and intermediate varieties.

The invention also provides a refrigerator including an assembly according to the invention.

Finally, the invention provides a method for producing a frothed fluid, wherein the method comprises:
providing an assembly or a refrigerator according to the invention;
activating the pump for creating a flow of fluid in the fluid channel;
sensing a temperature of a fluid adjacent or in the fluid inlet with the first temperature sensor;
transmitting the first temperature signal from the first temperature sensor to the electronic controller assembly which first temperature signal is associated with the sensed temperature of the fluid adjacent or in the fluid inlet;
controlling the air supply assembly in response to at least the first temperature signal for controlling the flow of air that is supplied to the fluid channel;
mixing a fluid in the fluid channel and air from the air channel to form a fluid/air-mixture;
frothing the fluid/air-mixture to form frothed fluid;
selectively heating or not heating the frothed fluid; and
dispensing the frothed fluid via the fluid outlet.

The method has the advantage that a more consistent quality of frothed fluid may be produced. This is due to the fact that the amount of air that is supplied to the fluid channel may be controlled in response to the temperature of the fluid in or near the fluid channel. Tests have shown that the quality of the frothed fluid depends on the temperature of the fluid that is used for producing the frothed fluid. The quality of the frothed fluid also is dependent on the ratio between the fluid and the air in the fluid/air-mixture. By controlling the controllable air valve in response to the temperature of the fluid near or in the fluid inlet, the frothed fluid that is produced may be of the desired quality. Fluctuations which may occur due to varying inlet temperatures of the fluid may be compensated by virtue of the fact that the flow of air that is supplied to the fluid is controlled in response to the sensed inlet temperature. Thus, frothed liquid with a reproducible and consistent quality may be produced.

Various embodiments are claimed in the dependent claims, which will be further elucidated with reference to an example shown in the figures. The embodiments may be combined or may be applied separately from each other.

DETAILED DESCRIPTION

Figure 1:
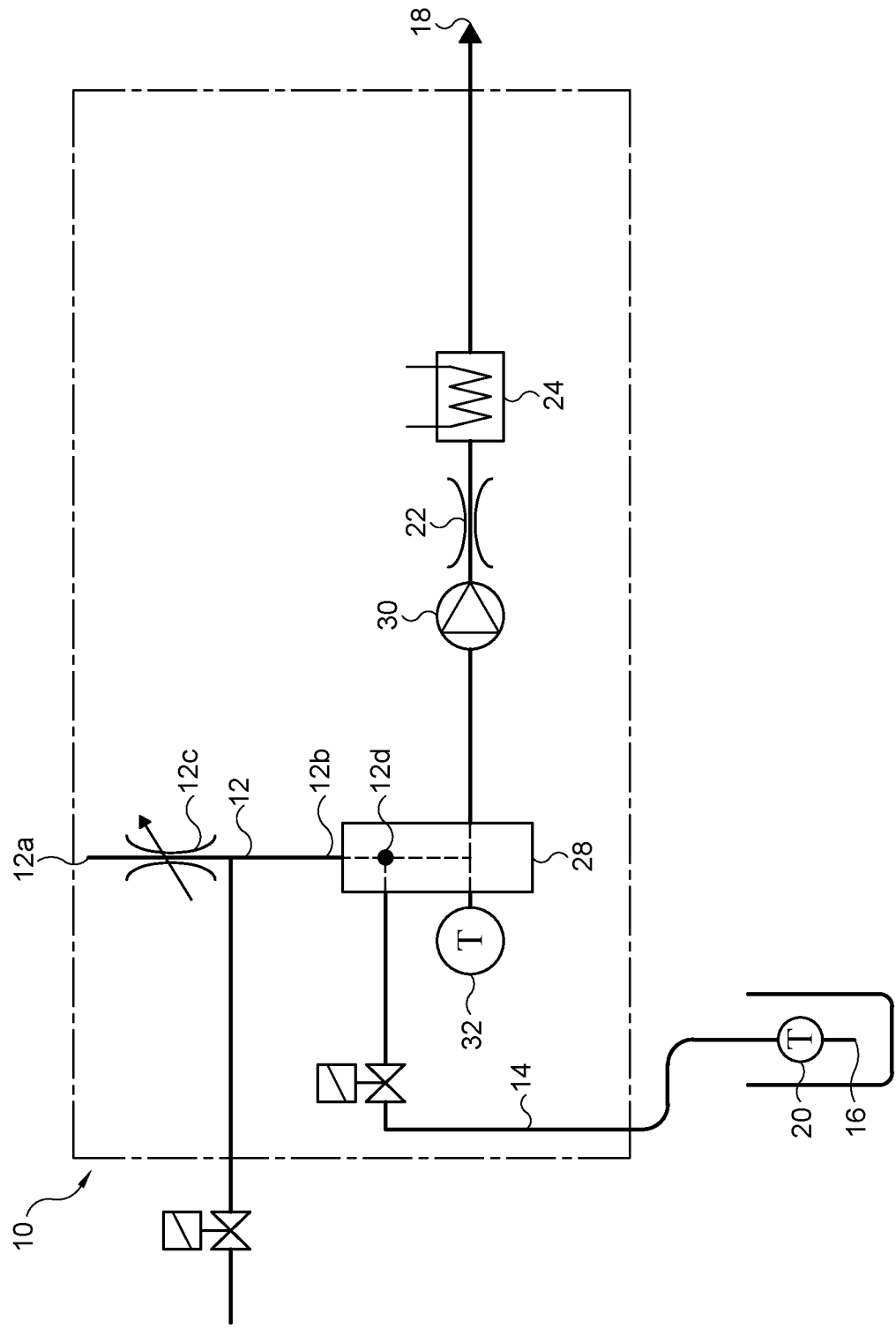
FIG. 1 shows a schematic overview of an embodiment of the assembly according to the invention.

FIG. 1 shows an example of the assembly according to the invention including several embodiments as well as the main aspect of the invention. In most general terms, the invention comprises an assembly for frothing a fluid 10, including an air supply assembly including an air source and an air channel 12 having an air inlet 12a and a downstream end 12b. The air source is connected to the air inlet 12a. The air supply assembly is configured to control the flow of air that is supplied to the downstream end 12b. Although other fluids may be frothed with the assembly according to the invention, the main application will be the frothing of milk of various types such as various grades of cow milk, almond milk, chocolate milk, goat milk, concentrated milk, soy milk, etc. The assembly 10 comprises a fluid channel 14 that extends from a fluid inlet 16 to a fluid outlet 18. The fluid channel 14 subsequently includes a first temperature sensor 20, an air inlet emanation point 14a, a frothing unit 22 including a pump 30, and a heater 24. The first temperature sensor 20 is positioned adjacent or in the fluid inlet 16 and is configured to generate a first temperature signal that is associated with a sensed temperature of the fluid adjacent or in the fluid inlet 16. The downstream end 12b of the air channel 12 is connected to the air inlet emanation point 14a. The assembly 10 also comprises an electronic controller assembly 26 that configured to receiving the first temperature signal and to control the air supply assembly in response to at least the first temperature signal for controlling the flow of air that is supplied to the fluid channel 14.

The advantages of such an assembly have been described in the summary and include amongst others that various types of desired fluid foam can be produced with a consistent quality even if the temperature of the fluid near or in the inlet of the fluid channel 14 varies. In the example shown in FIG. 1, the flow of air supplied by the air supply assembly is controlled with the controllable air valve.

In an embodiment, the air source may include an air pump with a variable output flow. In that case, the electronic controller assembly 26 may be configured for controlling the air pump output flow in response to at least the first temperature signal so as to control the flow of air that is supplied to the fluid channel 14.

An air pump has the advantage that no cylinders with pressurized air have to be exchanged.

In an embodiment, the air source may include an air cylinder or an air pump, wherein the air supply assembly includes a controllable air valve 12c that may be mounted in the air channel 12. In that embodiment, the electronic controller assembly 26 may be configured for controlling the controllable air valve 12c in response to the first temperature signal so as to control the flow of air that is supplied to the fluid channel 14.

A pressurized air cylinder has the advantage that pressurized air is instantly available.

A combination of a pump and an air cylinder or a similar buffer tank as air source is also feasible. The air pump may be used to pressurize the air cylinder. Such a combination guarantees the instant availability of pressurized air and has the advantage that no pressurized air cylinders have to be exchanged.

The temperature of the fluid adjacent or in the fluid inlet may vary within a range of temperatures wherein range of temperatures extends from a relatively low temperature to a relatively high temperature. The flow of air that may be supplied may also be varied within a range of flows wherein the range of flows extends from a relatively small flow to a relatively high flow. In this context flow is the volume fluid that is supplied per time expressed in, for example, ml/s. In an embodiment, the electronic controller assembly 26 may be configured to control the air supply assembly such that, when the temperature of the fluid is relatively low within the range of temperatures, the flow of air is controlled to be relatively low in the range of flows, and that, when the temperature of the fluid is relatively high within the range of temperatures, the flow of air is controlled to be relatively high in the range of flows.

By means of such a control, a consistent quality of foam may be obtained even if the temperature of the fluid at the fluid inlet varies from relatively low to relatively high within said range.

In an embodiment, of which an example is shown in FIG. 1, the frothing unit may include a fluid restriction 22 that is positioned downstream of the pump 30 and upstream from the heater 24.

The use of a fluid restriction 22 for frothing the fluid in the assembly 10 has the advantage that frothed fluid with a relatively high quality frothed liquid can be produced. Apart from that, a fluid restriction 22 is a very simple construction that can be easily cleaned.

In an embodiment, the electronic controller assembly 26 may be configured for controlling the heater 24 in response to at least the first temperature signal for controlling the heat output of the heater 24.

With such an embodiment, the heat output of the heater 24 can be controlled in dependence of the temperature of the fluid to be frothed at the inlet of the fluid channel. By doing so, it may be prevented that the frothed fluid that is heated will start to boil. Consequently, the taste of the fluid will remain very good and no fluid will burn-on or cake to the walls of the heater. Especially when the fluid is milk, it is of importance that the milk does not boil because the taste of the milk will deteriorate when the milk has boiled. Consequently, the quality of the frothed milk will be consistent both with respect to taste as well as appearance.

In an embodiment, of which an example is shown in FIG. 1, the assembly 10 may comprise a second temperature sensor 32. The second temperature sensor 32 may be positioned in the fluid channel 14 between the air inlet emanation point 14a and the frothing unit 22. The second temperature sensor 32 may be configured to generate a second temperature signal that is associated with a sensed temperature of the fluid/air-mixture and/or a cleaning fluid. The electronic controller assembly 26 may be configured for receiving the second temperature signal and for controlling the heater 24 in response to at least the second temperature signal for controlling the heat output of the heater 24.

In addition to providing the correct air/fluid-ratio in the air/fluid-mixture, the quality of the frothed fluid may also, or additionally, be determined by the temperature of the frothed fluid that is dispensed. A heated frothed fluid may, for example, have a temperature that is approximately 70° C. In stead of or in addition to controlling the heater 24 in response to the first temperature signal generated by the first temperature sensor 20, the heater 24 may also be controlled on the basis of the second temperature signal generated by the second temperature sensor 32 which directly measures the temperature of the fluid/air-mixture. With the second temperature signal or with the combination of the first and the second temperature signals the heater 24 can be controlled by the electronic controller assembly even more accurately so as to output the exact amount of heat that is necessary to dispense frothed fluid of the desired temperature. Thus, over- or under-heating may be prevented. Additionally, the second temperature 32 may also be used for controlling the temperature of a cleaning agent with which the fluid channel 14 is cleaned.

In an embodiment, the electronic controller assembly 26 may be configured to control the flow of air supplied by the air supply assembly in response to a flow signal that is associated with the flow of the fluid in the fluid channel 14. Such an embodiment not only determines flow of air supplied by the air supply assembly in response to the temperature of the fluid at or in the fluid inlet but additionally in response to a flow signal that is indicative of the flow (i.e. volume/time) of the fluid within the fluid channel 14. The flow signal may be generated by a flow meter that may be included in the flow channel 14. However, the flow signal may also be a controller signal for the pump. For example, the flow signal may be a pump speed or a percentage of the maximum pump speed. The pump speed may be set in dependence of the recipe of the fluid foam. When a dry foam is desired, the pump speed may be set slower than when a wet fluid foam is desired. When the pump speed is relatively low, a smaller flow of air may be supplied to the fluid channel 14 than when the pump speed is, for example, 100% of the maximum speed of the pump.

In an embodiment, the electronic controller assembly 26 may be configured for receiving a user-generated instruction on the type of fluid that is supplied to the fluid inlet 16. The electronic controller assembly 26 may further be configured for controlling the air supply assembly in response to the user-generated instruction for controlling the flow of air that is supplied in to the fluid channel 14.

The quality of the frothed fluid may be increased even further by also taking into account the type of the fluid that is supplied to the fluid inlet 16. In this embodiment, the electronic controller assembly 26 may be programmed with information on various fluids that may be processed by the assembly 10, wherein the user-generated information on the fluid supplied to the fluid inlet may be used to optimize the fluid/air-ratio by controlling the amount of air that is supplied to the fluid channel 14. The type of fluid may for example include cow milk containing various fat percentages, almond milk, goat milk, buttermilk or chocolate milk. The characteristics may for example include the percentage of fat, the protein content, the presence or absence of lactose and/or the source of the fluid.

In an embodiment of which an example is provided in FIG. 1, in which the frothing unit 22 is a fluid restriction, the fluid restriction 22 may extend along a central axis over a predetermined length and may comprise an orifice with a reduced diameter relative to a diameter of the fluid channel 14.

Such a fluid restriction is simple of construction and may be cleaned very effectively because the inner structure is smooth and does not contain cavities which may be poorly accessible for cleaning agent.

In an embodiment, the length of the fluid restriction 22 may be in the range of 1 mm to 8 mm, and may preferably be 4 mm. The diameter of the orifice of the fluid restriction 22 may be in the range of 0.4 mm to 1.5 mm and may be preferably 0.7 mm.

A fluid restriction of a length of 4 mm and having an orifice size of 0.7 mm, for example in the form of a fixed fluid nozzle, results in a high quality frothed liquid. Several different milk-based fluids can be processed into high quality frothed fluid with this embodiment of the fluid restriction. More specifically, the fluid restriction 22 can be used to froth skimmed, semi-skimmed and full milk to high quality frothed milk. In addition, high quality frothed fluid can be produced using semi-skimmed lactose-free milk and cappuccino milk.

In an embodiment, of which an example is shown in FIG. 1, in which the frothing unit 22 is a fluid restriction, the fluid restriction 22 may be mounted in an outlet of the pump 30.

Mounting the fluid restriction 22 in the outlet of the pump 30 may result in a more compact assembly.

In an embodiment, the heater 24 may include a thick film heating element.

A thick film heating element provides several advantages over heating elements used in prior art devices, such as electrical resistance rods. A thick film heating element has a low thermal mass and a relatively steep temperature profile. As a result, the heater 24 is capable of heating up and cooling down in a relatively short period. This makes it possible to provide a single channel 14 through which both hot frothed fluid and cold frothed fluid can be dispensed without incurring either long periods between subsequent dispensing actions or cross-temperature effects between subsequent dispensing actions. The use of a thick film heating element therefore allows a more simple and compact construction, wherein only a single fluid channel 14 is required from which both hot and cold frothed fluids can alternatingly be dispensed. Such a simple construction was not available in for example EP 2.120.656. In EP 2.120.656 two separate channels and a three-way valve were positioned after the frothing unit and the hot frothed fluid was dispensed through a first one of these two channels that was provided with a heating unit, whereas the cold frothed fluid was dispensed through a second one of these two channel in order to prevent unwanted heating of the cold frothed fluid. The three-way valve was actuated to select through which one of the two separate channels the frothed fluid should be dispensed. A three-way valve is more difficult to clean than a simple single channel. By consequence, the arrangement with a thick film heater through which both hot and cold milk is dispensed is more easy to clean which is, from a hygienic point of view of the utmost importance. An additional advantage is that the heater 24, by virtue of the short period required to heat up and cool down, can be switched off, rather than to be kept in standby mode. This reduces the energy use of the assembly 10, while still providing high availability.

In an embodiment, the heater 24 may be a flow-through heater, preferably a high pressure flow-through heater, and more preferably an ultra-high pressure flow-through heater.

In an embodiment, the assembly 10 may comprise a gripper element 44 that is connected to the fluid channel 14 near the fluid inlet 16.

Figure 3:
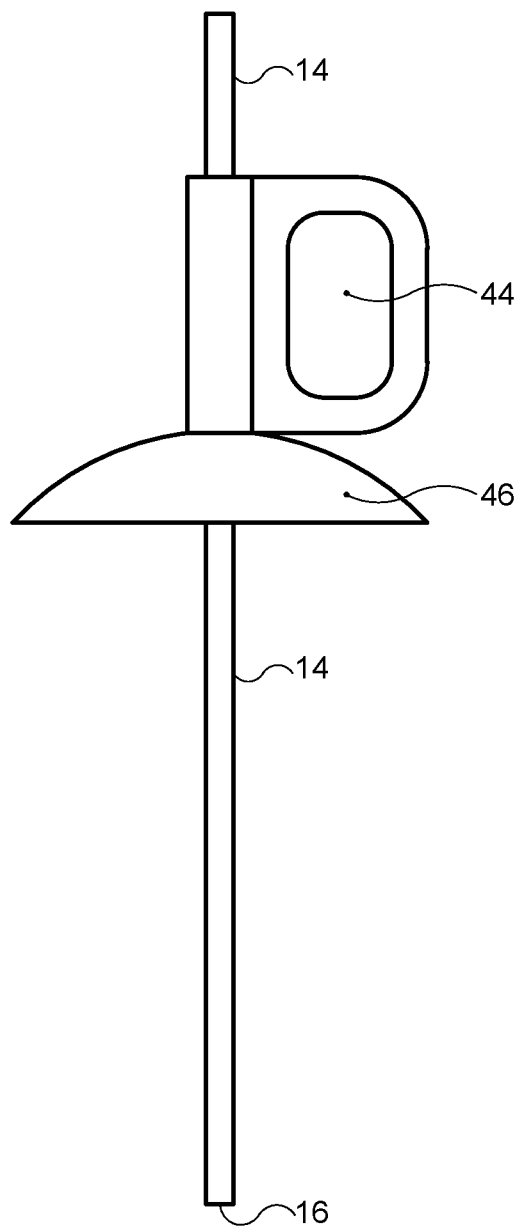
FIG. 3 shows an example of a fluid channel including a gripper element.

In an embodiment, of which an example is shown in FIG. 3, the assembly 10 may comprise a gripper element 44 that is connected to the fluid channel 14 near the fluid inlet 16. In the example shown in FIG. 3, the fluid inlet 16 is a stiff dip tube which may be manufactured from a metal or a rigid non-porous plastic. Alternatively, the fluid inlet 16 may be a flexible tube. However, a stiff dip tube is more convenient to place in and take out of a fluid container containing the fluid that is to be frothed.

In an elaboration of the previous embodiment, the gripper element 44 may comprise a cap 46, for example an umbrella-shaped cap. The cap 46 may be placeable over an opening of a fluid reservoir in which the fluid inlet 16 is inserted.

The gripper 44 may be provided with a cap 46, which allows the gripper 44 to be conveniently placed over an opening of a fluid reservoir, so that the fluid reservoir is substantially closed off. Therewith, the cap 46 forms a seal that prevents fouling of the fluid in the fluid reservoir, while simultaneously providing a handhold for removing the fluid inlet 16 from the fluid reservoir without fouling or damaging the fluid inlet 16 or the fluid channel 14. As such, transferring the fluid inlet 16 from an emptied fluid reservoir to a new, filled fluid reservoir can be done in a hygienic and easy manner.

In an embodiment, the assembly may comprise an upstream fluid line bounding an upstream part of the fluid channel 14, an air line bounding the air channel 12b, and a connection block 28 positioned in the fluid channel 14 between the first temperature sensor 20 and the frothing unit. The connection block 28 may include a fluid entrance opening to which a downstream end of the upstream fluid line is connected. The connection block 28 may additionally comprise an air inlet opening, to which a downstream end of the air line is connected. An internal fluid channel part may extend within the connection block 28 as well as an internal air channel part. The air inlet emanation point 14a may be inside the connection block 28 and forms the connection between the internal fluid channel part and the internal air channel part. Finally, the connection block 28 may include an outlet opening formed by the downstream end of the internal fluid channel part. The assembly further may further comprise a downstream fluid line which bounds a part of the fluid channel 14 and of which an upstream end is connected to the outlet opening of the connection block 28. The second temperature sensor 32 may be mounted in the connection block 28. The connection between the upstream fluid line and the connection block 28, the connection between the air line and the connection block 28, as well as the connection between the downstream fluid line and the connection block 28 may be flare connections.

Such a connection block 28 has the advantage that it can be easily disinfected during a cleaning operation because the internal structure may be smooth without any cavities in which milk may remain when the cleaning operation is performed. The upstream and downstream fluid lines may be flexible tubes of a suitable plastic. The free ends of the fluid lines may be flared, i.e. be shaped to extend radially outwardly so to form a radially extending flange that is an integral part of the tube. Such a radially extending flange may be clamped between an end surface of the connecting block and a connection nut having internal screw thread that is screwed on a screw coupling that is provided at the fluid inlet, the fluid outlet and the air inlet of the connection block 28. Again, by virtue of such flared tube ends, the connection between the fluid lines and air line on the one hand and the connection block 28 on the other hand may be very smooth virtually without any cavities in which milk or fluid may remain even during a cleaning operation. Consequently, the hygiene of the assembly according to this embodiment is optimally guaranteed.

Figure 2:
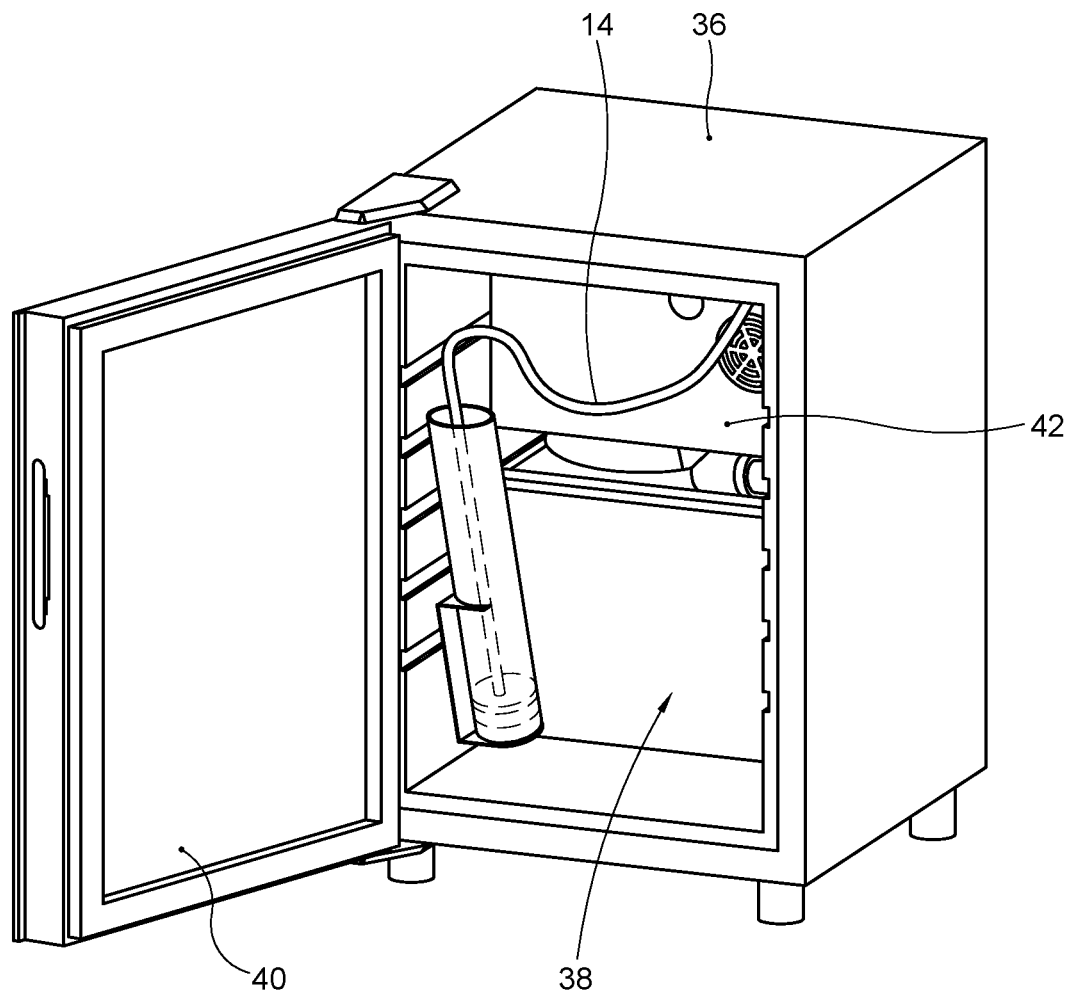
FIG. 2 shows a perspective view of an example of a refrigerator including the assembly.

The invention further provides a refrigerator including a housing 36 bounding a refrigerator space 38. An example of such a refrigerator is shown in FIG. 2. The housing includes a door 40 that has an open position in which the refrigerator space 38 is accessible via a door opening and a closed position for closing off the door opening. The refrigerator further comprises the assembly for frothing a fluid according to the invention, wherein the major components of the assembly 10 for frothing a fluid, including at least the frothing unit 22, the heater 24, the first temperature sensor 20 and the second temperature sensor 32 are positioned in the refrigerator space 38.

The refrigerator space 38 may be refrigerated to a relatively low temperature to optimize the cooling for the components. In addition, having a refrigerated housing space 38 may allow a fluid reservoir to be placed in the housing space 38 of the housing 36, so that the fluid contained in the reservoir may be kept from decay. This may for example be important with perishable goods, such as milk or custard-based products.

Furthermore, by designing the components of the assembly 10 for refrigerated spaces, the assembly may be retrofitted in existing refrigerators.

In an embodiment, an example of which is shown in FIG. 2, the assembly for frothing a fluid 10 may comprise a component tray 42 that is removably mounted in the refrigerator space 38. The component tray 42 may be removable from the refrigerator space 38 in the open position of the door 40, and may support at least the frothing unit 22, the heater 24 and at least part of the fluid channel 14.

The advantage of having a removably mounted component tray 42 is that the components are easily accessible for repair of maintenance. In addition, the component tray 42 may be designed such that the components provide an optimal performance while simultaneously reducing the required installation space, thus allowing a compact and reliable product. Also, the component tray may, in case of repair, maintenance or replacement be removed from the refrigerator space 38, after which the door 40 may be closed again in order to retain a low inner temperature in the refrigerator space 38.

The invention also comprises a method for frothing a fluid. The method includes providing an assembly according to any one of claims 1-15 or a refrigerator according to claim 16 or 17. The method further comprises:
  activating the pump 30 for creating a flow of fluid in the fluid channel 14;
  sensing a temperature of a fluid adjacent or in the fluid inlet with the first temperature sensor 20;
  transmitting the first temperature signal from the first temperature sensor 20 to the electronic controller assembly 26 which first temperature signal is associated with the sensed temperature of the fluid adjacent or in the fluid inlet 16;
  controlling the air supply assembly in response to at least the first temperature signal for controlling the flow of air that is supplied to the fluid channel 14;
  mixing a fluid in the fluid channel and air from the air channel to form a fluid/air-mixture;
  frothing the fluid/air-mixture to form frothed fluid;
  selectively heating or not heating the frothed fluid; and
  dispensing the frothed fluid via the fluid outlet.

The advantages of the method according to the invention have been described in the summary, to which reference is made. The selective heating of the frothed fluid may be effected by switching the heater on during dispensing of the frothed fluid to produce hot foam or keeping the heater switched off to produce cold foam. The method provides a more constant foam quality of a desired type, even when the temperature of the fluid adjacent the inlet varies.

As described above, the temperature of the fluid adjacent or in the fluid inlet may vary within a range of temperatures wherein range of temperatures extends from a relatively low temperature to a relatively high temperature. Also, the flow of air that may be supplied may vary within a range of flows wherein the range of flows extends from a relatively small flow to a relatively high flow.

In an embodiment of the method, the electronic controller assembly 26 may control the air supply assembly such that, when the temperature of the fluid is relatively low within the range of temperatures, the flow of air is controlled to be relatively low in the range of flows, and that, when the temperature of the fluid is relatively high within the range of temperatures, the flow of air is controlled to be relatively high in the range of flows.

With such a method, a frothed fluid, such as a frothed milk, of a constant quality as desired may be obtained even when the temperature of the fluid at the inlet varies. Thus, cold or hot dry foam or cold or hot wet foam of having a good stability and structure may be obtained under varying temperature conditions of the fluid to be frothed.

In embodiment, the electronic controller assembly may control the heater 24 in response to at least the first temperature signal for controlling the heat output of the heater 24.

In an embodiment, in which the assembly includes the features of claim 4, i.e. a second temperature sensor 32 for sensing the temperature of the fluid/air-mixture to be frothed, the method may comprise:
  sensing a temperature of the fluid/air-mixture with the second temperature sensor 32;
  generating a second temperature signal by means of the second temperature sensor 32 which second temperature signal is associated with the sensed temperature of the fluid/air-mixture;
  transmitting the second temperature signal to the electronic controller assembly 26;
  controlling the heater 24 by means of the electronic controller assembly 26 in response to at least the second temperature signal of the fluid/air mixture to output a desired amount of heat for heating the frothed fluid.

With the method according to these embodiments both the composition of the fluid/air-mixture as well as the temperature of the fluid at the inlet and/or the temperature of the frothed fluid that is formed in the assembly can be controlled in great detail. As a result, a very consistent foam quality and foam temperature of frothed fluid can be produced using the assembly. In addition, the extensive control allows the production of a relatively high quality of frothed fluid as well.

In an embodiment, the method may also include controlling the air supply assembly in response to a flow signal that is associated with the flow of the fluid in the fluid channel 14. When the electronic controller assembly 26 receives a signal indicative of a high flow of fluid, the controllable air valve 12c will be opened further so that more air will be supplied, whereas when the flow of the fluid is smaller, less air will be supplied.

The descriptions above are intended to be illustrative, not limiting. Thus, it will be apparent to one skilled in the art that modifications may be made to the invention as described in the foregoing without departing from the scope of the claims set out below. Various embodiments may be applied in combination or may be applied independently from one another. Reference numbers used in the above detailed description are not intended to limit the description of the embodiments to the examples shown in the figures. The figures just represent examples and the embodiments may be embodied in other ways than the specific way shown in the examples of the drawings.

LEGEND

10—assembly for frothing fluid
12—air channel
12a—air inlet
12b—downstream end of the air channel
12c—controllable air valve
14a—air inlet emanation point
14—fluid channel
16—fluid inlet 18—fluid outlet
20—first temperature sensor
22—frothing unit
24—heater
26—electronic controller assembly
28—connection block
30—pump
32—second temperature sensor
34—air temperature sensor
36—housing
38—refrigerator space
40—door
42—component tray
44—gripper element
46—cap

What is claimed is:

1. An assembly for frothing a fluid, the assembly comprising:
an air supply assembly including an air source and an air channel having an air inlet and a downstream end, the air source being connected to the air inlet, wherein the air supply assembly is configured to control the flow of air that is supplied to the downstream end;
a fluid channel extending from a fluid inlet to a fluid outlet, the fluid channel including subsequently:
a first temperature sensor that is positioned adjacent or in the fluid inlet and that is configured to generate a first temperature signal that is associated with a sensed temperature of a fluid adjacent or in the fluid inlet;
an air inlet emanation point to which the downstream end of the air channel is connected;
a frothing unit including a pump;
a heater;
and wherein the assembly comprises:
an electronic controller assembly configured for:
receiving the first temperature signal, and
controlling the air supply assembly in response to at least the first temperature signal for controlling the flow of air that is supplied to the fluid channel.

2. The assembly according to claim 1, wherein the air source includes an air pump with a variable output flow, wherein the electronic controller assembly is configured for controlling the air pump output flow in response to at least the first temperature signal so as to control the flow of air that is supplied to the fluid channel.

3. The assembly according to claim 1, wherein the air source includes an air cylinder or an air pump, wherein the air supply assembly includes a controllable air valve, wherein the electronic controller assembly is configured for controlling the controllable air valve in response to the first temperature signal so as to control the flow of air that is supplied to the fluid channel.

4. The assembly according to claim 1, wherein the temperature of the fluid adjacent or in the fluid inlet lies within a range of temperatures, and wherein the flow of air that may be supplied lies within a range of flows wherein the range of flows extends from a relatively small flow to a relatively high flow, and wherein, the electronic controller assembly is configured to control the air supply assembly such that, when the temperature of the fluid is relatively low within the range of temperatures, the flow of air is controlled to be relatively low in the range of flows, and that, when the temperature of the fluid is relatively high within the range of temperatures, the flow of air is controlled to be relatively high in the range of flows.

5. The assembly according to claim 1, wherein the frothing unit comprises a fluid restriction that is positioned downstream of the pump and upstream from the heater.

6. The assembly according to claim 1, wherein the electronic controller assembly is configured for controlling the heater in response to at least the first temperature signal for controlling the heat output of the heater.

7. The assembly according to claim 1, further comprising:
a second temperature sensor that is positioned in the fluid channel between the air inlet emanation point and the frothing unit and that is configured to generate a second temperature signal that is associated with a sensed temperature of the fluid/air-mixture and/or cleaning fluid;
wherein the electronic controller assembly is configured for:
receiving the second temperature signal; and
controlling the heater in response to at least the second temperature signal for controlling the heat output of the heater.

8. The assembly according to claim 1, wherein the electronic controller assembly is configured to control the flow of air supplied by the air supply assembly in response to a flow signal that is associated with the flow of the fluid in the fluid channel.

9. The assembly according to claim 1, wherein the electronic controller assembly is configured for:
receiving a user-generated instruction on the type of fluid that is supplied to the fluid inlet; and
controlling the air supply assembly in response to the user-generated instruction for controlling the flow of air that is supplied in to the fluid channel.

10. The assembly according to claim 1, wherein the air source includes an air cylinder or an air pump, wherein the air supply assembly includes a controllable air valve, wherein the electronic controller assembly is configured for controlling the controllable air valve in response to the first temperature signal so as to control the flow of air that is supplied to the fluid channel, wherein the fluid restriction extends along a central axis over a predetermined length, and wherein the fluid restriction comprises an orifice with a reduced diameter relative to a diameter of the fluid channel.

11. The assembly according to claim 10, wherein the length of the fluid restriction is in the range of 1 mm to 8 mm, and wherein the diameter of the orifice of the fluid restriction is in the range of 0.4 mm to 1.5 mm.

12. The assembly according to claim 1, when dependent on claim 3, wherein the fluid restriction is mounted in an outlet of the pump.

13. The assembly according to claim 1, wherein the heater includes a thick film heating element.

14. The assembly according to claim 1, further comprising a gripper element that is connected to the fluid channel near the fluid inlet.

15. The assembly according to claim 14, wherein the gripper element comprises a cap that is placeable over an opening of a fluid reservoir in which the fluid inlet is inserted.

16. The assembly according to claim 1, wherein the assembly comprises
an upstream fluid line bounding an upstream part of the fluid channel;
an air line bounding the air channel;
a connection block positioned in the fluid channel between the first temperature sensor and the frothing unit, wherein the connection block includes:

a fluid entrance opening to which a downstream end of the upstream fluid line is connected;

an air inlet opening, to which a downstream end of the air line is connected;

an internal fluid channel part;

an internal air channel part, wherein the air inlet emanation point is inside the connection block and forms the connection between the internal fluid channel part and the internal air channel part;

an outlet opening;

wherein the assembly further comprises:

a downstream fluid line which bounds a part of the fluid channel and of which an upstream end is connected to the outlet opening of the connection block;

wherein a second temperature sensor is mounted in the connection block, wherein the connection between the upstream fluid line and the connection block, the connection between the air line and the connection block, as well as the connection between the downstream fluid line and the connection block are flare connections.

17. A refrigerator comprising:

a housing bounding a refrigerator space, the housing including a door that has an open position in which the refrigerator space is accessible via a door opening and a closed position for closing off the door opening; and the assembly for frothing a fluid according to any one of the preceding claims, wherein the major components of the assembly for frothing a fluid, including at least the frothing unit, the heater, the first temperature sensor and the second temperature sensor are positioned in the refrigerator space.

18. The refrigerator according to claim 17, wherein the assembly for frothing a fluid comprises a component tray that is removably mounted in the refrigerator space, wherein the component tray is removable from the refrigerator space in the open position of the door, and wherein the component tray supports at least the frothing unit, the heater and at least part of the fluid channel.

19. A method for producing a frothed fluid, the method comprising:

providing an assembly according to claim 1;

activating the pump for creating a flow of fluid in the fluid channel;

sensing a temperature of a fluid adjacent or in the fluid inlet with the first temperature sensor;

transmitting the first temperature signal from the first temperature sensor to the electronic controller assembly, which first temperature signal is associated with the sensed temperature of the fluid adjacent or in the fluid inlet;

controlling the air supply assembly in response to at least the first temperature signal for controlling the flow of air that is supplied to the fluid channel;

mixing a fluid in the fluid channel and air from the air channel to form a fluid/air-mixture;

frothing the fluid/air-mixture to form frothed fluid;

selectively heating or not heating the frothed fluid; and dispensing the frothed fluid via the fluid outlet.

20. The method according to claim 19, wherein the temperature of the fluid adjacent or in the fluid inlet lies within a range of temperatures, and wherein the flow of air that may be supplied lies within a range of flows wherein the range of flows extends from a relatively small flow to a relatively high flow, and wherein, the electronic controller assembly controls the controllable air supply assembly such that, when the temperature of the fluid is relatively low within the range of temperatures, the flow of air is controlled to be relatively low in the range of flows, and that, when the temperature of the fluid is relatively high within the range of temperatures, the flow of air is controlled to be relatively high in the range of flows.

21. The method according to claim 19, wherein the electronic controller assembly controls the heater in response to at least the first temperature signal for controlling the heat output of the heater.

22. The method according to claim 19, wherein the assembly includes a second temperature sensor that is positioned in the fluid channel between the air inlet emanation point and the frothing unit and that is configured to generate a second temperature signal that is associated with a sensed temperature of the fluid/air-mixture and/or cleaning fluid, and wherein the method comprises:

sensing a temperature of the fluid/air-mixture with the second temperature sensor;

generating a second temperature signal by means of the second temperature sensor which second temperature signal is associated with the sensed temperature of the fluid/air-mixture;

transmitting the second temperature signal to the electronic controller assembly;

controlling the heater by means of the electronic controller assembly in response to at least the second temperature signal of the fluid/air mixture to output a desired amount of heat for heating the frothed fluid.

23. The method according to claim 19, further comprising:

controlling the controllable air supply assembly in response to a flow signal that is associated with the flow of the fluid in the fluid channel.

\* \* \* \* \*